United States Patent
Benson et al.

(10) Patent No.: US 8,117,057 B2
(45) Date of Patent: Feb. 14, 2012

(54) RETAIL PRODUCTION GUIDE FOR STORE-PREPARED FOOD ITEMS

(75) Inventors: Wayne Mark Benson, Waynesville, OH (US); Joshua Alen Marsh, Lebanon, OH (US)

(73) Assignee: The Kroger Co., Cincinnati, OH (US)

( * ) Notice: Subject to any disclaimer, the term of this patent is extended or adjusted under 35 U.S.C. 154(b) by 1156 days.

(21) Appl. No.: 11/606,760

(22) Filed: Nov. 30, 2006

(65) Prior Publication Data

US 2008/0133317 A1 Jun. 5, 2008

(51) Int. Cl.
G06Q 10/00 (2006.01)

(52) U.S. Cl. .......................... 705/7.29; 705/7.24; 705/28

(58) Field of Classification Search .................... None
See application file for complete search history.

(56) References Cited

U.S. PATENT DOCUMENTS

| | | | |
|---|---|---|---|
| 4,256,569 A * | 3/1981 | Wallace .......................... 209/3.3 |
| 4,737,910 A | 4/1988 | Kimbrow |
| 4,947,322 A | 8/1990 | Tenma et al. |
| 5,128,861 A | 7/1992 | Kagami et al. |
| 5,168,455 A | 12/1992 | Hooper |
| 5,237,496 A | 8/1993 | Kagami et al. |
| 5,712,985 A * | 1/1998 | Lee et al. ............................ 705/7 |
| 6,026,372 A | 2/2000 | Savage |
| 6,366,890 B1 | 4/2002 | Usrey |
| 6,397,199 B1 | 5/2002 | Goodwin, III |
| 6,668,245 B1 * | 12/2003 | Iida .................................. 705/16 |
| 6,814,993 B2 * | 11/2004 | Yamagata et al. ............. 426/391 |
| 6,842,719 B1 | 1/2005 | Fitzpatrick et al. |
| 6,954,736 B2 * | 10/2005 | Menninger et al. .............. 705/28 |
| 7,292,991 B2 * | 11/2007 | Peressini et al. ................. 705/22 |
| 7,379,890 B2 * | 5/2008 | Myr et al. .................... 705/7.35 |
| 7,505,868 B1 * | 3/2009 | Shan ............................. 702/182 |
| 2001/0044761 A1 | 11/2001 | Berger et al. |
| 2002/0120534 A1 | 8/2002 | Howard et al. |
| 2003/0055712 A1 * | 3/2003 | Eltchaninoff et al. .......... 705/10 |
| 2003/0154142 A1 | 8/2003 | Ginsburg et al. |
| 2004/0034570 A1 | 2/2004 | Davis |
| 2004/0148217 A1 | 7/2004 | Lauring et al. |
| 2005/0189141 A1 | 9/2005 | Fano et al. |
| 2006/0069606 A1 | 3/2006 | Kaczkowski et al. |
| 2006/0117303 A1 * | 6/2006 | Gizinski ....................... 717/136 |
| 2007/0061210 A1 * | 3/2007 | Chen et al. ...................... 705/22 |
| 2008/0059279 A1 * | 3/2008 | Goldschneider et al. ....... 705/10 |

OTHER PUBLICATIONS http://office.microsoft.com/en-us/excel-help/forecast-inventory-levels-with-moving-average-analysis-HA001086480.aspx.*
http://www.mathworks.com/matlabcentral/fileexchange/8251-moving-averages-moving-median-etc.*

* cited by examiner

*Primary Examiner* — Ryan Zeender
*Assistant Examiner* — Dana Amsdell
(74) *Attorney, Agent, or Firm* — Pillsbury Winthrop Shaw Pittman LLP

(57) ABSTRACT

A computer-assisted method of determining and producing quantities of perishable, store-prepared food items that should be displayed for consumer selection and purchase on a daily basis is provided. The method includes collecting daily sales data for the perishable, store-prepared food items and saving the daily sales data in memory. For a current specific day of the week, the daily sales data is processed for prior occurrences of the specific day to determine, for each of the perishable, store-prepared food items, a quantity to be placed on display. A total preparation quantity is reported for each of the perishable, store-prepared food items.

20 Claims, 11 Drawing Sheets

Edit UPC Specific Details:(*=required)

UPC Number: 0020218400000

*Description: BF LOIN T-BONE STEAK #260

*Select A Commodity: BEEF

*Allow Lift Factor Code: N-Do Not Allow

*Default Presentation Minimum: 3    Store Override ← 34

Save UPC Changes    Cancel

This UPC is a member of these Families:

| Family Description | Actions |
|---|---|
| Choice Short Loin | Edit |
| | Add to Family |

Fig. 2

UPC Number: 0020218400000
BF LOIN T-BONE STEAK #260
Default Presentation Minimum: 3

| MAINSTREAM » | 6 | Update Stores In Group |

*Use this feature to update multiple stores with the same Presentation Minimum

| Zone:A | | Zone:B | | Zone:C | | Zone:D | | Zone:E | | Zone:F | | Zone:G | |
|---|---|---|---|---|---|---|---|---|---|---|---|---|---|
| 520 | 6 | 202 |   | 472 |   | 216 | 6 | 415 |   | 103 |   | 184 |   |
| 576 | 6 | 215 |   | 486 | 6 | 258 |   | 481 |   | 272 |   | 263 | 6 |
| 577 | 6 | 251 |   | 494 | 6 | 299 |   | 487 |   | 273 |   | 457 | 6 |
| 578 | 6 | 268 |   | 530 | 6 | 514 | 6 | 492 | 6 | 327 | 6 | 495 |   |
| 579 | 6 | 284 |   | 547 | 6 | 522 |   | 498 | 6 | 350 | 6 | 515 | 6 |
| 615 | 6 | 313 |   | 602 | 6 | 529 | 6 | 620 |   | 388 | 6 | 528 | 6 |
| 619 |   | 371 |   | 605 | 6 | 532 | 6 | 629 | 6 | 399 | 6 | 614 | 6 |
| 632 |   | 512 | 6 | 611 | 6 | 538 | 6 | 649 |   | 506 | 6 | 622 | 6 |
| 670 |   | 558 |   | 618 | 6 | 542 | 6 | 650 | 6 | 510 | 6 | 637 | 6 |
| 671 | 6 | 562 | 6 | 630 | 6 | 543 | 6 | 651 |   | 555 |   | 642 | 6 |
| 686 | 6 | 591 | 6 | 652 | 6 | 590 |   | 656 | 6 | 594 | 6 | 647 | 6 |

| bas_con_upc_no | bas_con_upc_tx | fam_grp_id | plu_no | var_chk_lst_cd | pri_prd_itm | dly_dmd_dfit_am | lft_fct_cd | lft_fct_am |
|---|---|---|---|---|---|---|---|---|
| 0020117300000 | BEEF RIB RIBEYE BONELESS HALF SELECT | 810 | 1359 | Y | N | 0 | D | 1.5 |
| 0020117300000 | BEEF RIB RIBEYE BONELESS HALF SELECT | 810 | 1359 | Y | N | 0 | D | 1.5 |
| 0020117300000 | BEEF RIB RIBEYE BONELESS HALF SELECT | 810 | 1359 | Y | N | 0 | D | 1.5 |
| 0020117300000 | BEEF RIB RIBEYE BONELESS HALF SELECT | 810 | 1359 | Y | N | 0 | D | 1.5 |
| 0020117300000 | BEEF RIB RIBEYE BONELESS HALF SELECT | 810 | 1359 | Y | N | 0 | D | 1.5 |
| 0020117300000 | BEEF RIB RIBEYE BONELESS HALF SELECT | 810 | 1359 | Y | N | 0 | D | 1.5 |
| 0020117600000 | BEEF RIB RIBEYE LIP ON BONELESS SELECT | 810 | 1355 | Y | N | 0 | D | 1.5 |
| 0020117600000 | BEEF RIB RIBEYE LIP ON BONELESS SELECT | 810 | 1355 | Y | N | 0 | D | 1.5 |
| 0020117600000 | BEEF RIB RIBEYE LIP ON BONELESS SELECT | 810 | 1355 | Y | N | 0 | D | 1.5 |
| 0020117600000 | BEEF RIB RIBEYE LIP ON BONELESS SELECT | 810 | 1355 | Y | N | 0 | D | 1.5 |
| 0020117600000 | BEEF RIB RIBEYE LIP ON BONELESS SELECT | 810 | 1355 | Y | N | 0 | D | 1.5 |
| 0020117600000 | BEEF RIB RIBEYE LIP ON BONELESS SELECT | 810 | 1355 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020197300000 | BEEF CHUCK UNDER BLADE STEAK BNLS CHOICE | 846 | 1236 | Y | N | 0 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202500000 | BEEF RIB RIBEYE STEAK LIP ON BNLS CHOICE | 841 | 1294 | Y | Y | 3 | D | 1.5 |
| 0020202600000 | BEEF RIB RIBEYE STEAK LIP ON BNLS FP CHC | 841 | 1298 | Y | N | 0 | D | 1.5 |
| 0020202600000 | BEEF RIB RIBEYE STEAK LIP ON BNLS FP CHC | 841 | 1298 | Y | N | 0 | D | 1.5 |
| 0020214500000 | BEEF LOIN PORTERHOUSE STEAK NT CHOICE | 838 | 1072 | Y | Y | 2 | D | 1.5 |
| 0020214500000 | BEEF LOIN PORTERHOUSE STEAK NT CHOICE | 838 | 1072 | Y | Y | 2 | D | 1.5 |
| 0020214500000 | BEEF LOIN PORTERHOUSE STEAK NT CHOICE | 838 | 1072 | Y | Y | 2 | D | 1.5 |
| 0020214500000 | BEEF LOIN PORTERHOUSE STEAK NT CHOICE | 838 | 1072 | Y | Y | 2 | D | 1.5 |
| 0020214500000 | BEEF LOIN PORTERHOUSE STEAK NT CHOICE | 838 | 1072 | Y | Y | 2 | D | 1.5 |
| 0020214500000 | BEEF LOIN PORTERHOUSE STEAK NT CHOICE | 838 | 1072 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020218400000 | BEEF LOIN T BONE STEAK NT CHOICE | 838 | 1067 | Y | Y | 2 | D | 1.5 |
| 0020224000000 | BEEF LOIN TOP LOIN STRIP STEAK BNLS NT FP O | 835 | 1095 | Y | N | 0 | D | 1.5 |
| 0020224000000 | BEEF LOIN TOP LOIN STRIP STEAK BNLS NT FP O | 835 | 1095 | Y | N | 0 | D | 1.5 |
| 0020223600000 | BEEF LOIN TOP LOIN STRIP STEAK BONELESS NT | 835 | 1091 | Y | Y | 3 | D | 1.5 |
| 0020223600000 | BEEF LOIN TOP LOIN STRIP STEAK BONELESS NT | 835 | 1091 | Y | Y | 3 | D | 1.5 |
| 0020223600000 | BEEF LOIN TOP LOIN STRIP STEAK BONELESS NT | 835 | 1091 | Y | Y | 3 | D | 1.5 |

Monday – 04/03 for Store: 277 Commodity: 500 BEEF Department: 09 MEAT

| Barcode + UPC | | Daily Target | Cut | Incase + Backstock = | Total Available | To Cut | Cutting Prioritization | | |
|---|---|---|---|---|---|---|---|---|---|

Beef Kabob — Med

| | beef beef cubes for 1585 kabobs | 2 | 1 | | | | 2-2 | 1-1 | 0-0 |
| 0020025390000 | | 2 | 2 | | | | 2-2 | 1-1 | 0-0 |
| | | 2 | 3 | | | | 2-2 | 1-1 | 0-0 |

Choice Short Loin

| | beef loin porterhouse steak nt choice 1072 | 4 | 1 | | | | 4-4 | 3-3 | 2-2 |
| 0020021450000 | | 4 | 2 | | | | 4-4 | 3-3 | 2-2 |
| | | 4 | 3 | | | | 4-4 | 3-3 | 2-2 |

| | beef loin t bone steak nt choice 1067 | <2> | 1 | | | | 2-2 | 1-1 | 0-0 |
| 0020021840000 | | <2> | 2 | | | | 2-2 | 1-1 | 0-0 |
| | | <2> | 3 | | | | 2-2 | 1-1 | 0-0 |

Fig. 5

Perishable Ordering Tool

EXCEPTIONS | SEARCH | MAIN

Note: The bold values represent the items on promotion.

Department: 09 Meat (Fresh) commodity: 550 BEEF

Week Ending Date: 10/28/2006

| Description | Like Week | Sunday | | Monday | | Tuesday | | Wednesday | | Thursday | | Friday | | Saturday | | Total WID | |
|---|---|---|---|---|---|---|---|---|---|---|---|---|---|---|---|---|---|
| UPC | | Base Proj Qty | MD | Base Proj Qty | MD | Base Proj Qty | MD | Base Proj Qty | MD | Base Proj Qty | MD | Base Proj Qty | MD | Base Proj Qty | MD | Base Proj Qty | MD |
| Beef Family Pack | | | | | | | | | | | | | | | | | |
| CHARCOAL STEAK FAMILY PACK | 35/2006 | 48 | 18 | 31 | 17 | 29 | 14 | 37 | 13 | 37 | 22 | 36 | 16 | 76 | 18 | 294 | 115 |
| 00201032000000 | | 85 | | 35 | | 42 | | 31 | | 36 | | 56 | | 63 | | 348 | |
| BEEF CHUCK SLCT ARM STEAK BNLS FAMILY PACK | 28/2006 | 2 | 5 | 4 | 7 | 5 | 3 | 7 | 4 | 11 | 8 | 20 | 1 | 26 | 9 | 75 | 37 |
| 00201058000000 | | 16 | | 2 | | 17 | | 8 | | 13 | | 14 | | 43 | | 113 | |
| Beef in bag | | | | | | | | | | | | | | | | | |
| BEEF BRISKET SLCT BRISKET WHL BNLS IN BAG | | 4 | 2 | 2 | 4 | 1 | 0 | 4 | 0 | 9 | 0 | 20 | 0 | 12 | 0 | 52 | 6 |
| 00201615000000 | | 8 | | 10 | | 5 | | 12 | | 9 | | 6 | | 21 | | 69 | |
| USDA SELECT BEEF BRISKET FLAT HALF IN BAG | | 5 | 0 | 2 | 0 | 6 | 0 | 5 | 0 | 13 | 0 | 8 | 0 | 8 | 0 | 47 | 0 |
| 00201622000000 | | 7 | | 2 | | 6 | | 8 | | 1 | | 7 | | 6 | | 35 | |

| Description | | Sunday | Monday | Tuesday | Wednesday | Thursday | Friday | Saturday | Total |
|---|---|---|---|---|---|---|---|---|---|
| 00111016942 - Colossal | 1st Cook (10 am to 1 pm) | 0 | 0 | 0 | 0 | 0 | 0 | 0 | 0 |
| | 2nd Cook (1 pm to 4 pm) | 0 | 0 | 0 | 0 | 0 | 0 | 0 | 0 |
| | 3rd Cook (4 pm to 7 pm) | 0 | 0 | 0 | 0 | 0 | 0 | 0 | 0 |
| | After 7 pm | 0 | 0 | 0 | 0 | 0 | 0 | 0 | 0 |
| 00111039272 - Regular | 1st Cook (10 am to 1 pm) | 0 | 1 | 1 | 0 | 1 | 1 | 1 | 4 |
| | 2nd Cook (1 pm to 4 pm) | 1 | 0 | 0 | 1 | 1 | 0 | 1 | 4 |
| | 3rd Cook (4 pm to 7 pm) | 0 | 1 | 1 | 1 | 1 | 1 | 1 | 7 |
| | After 7 pm | 0 | 0 | 0 | 0 | 0 | 0 | 0 | 0 |
| 00111039272 - Regular Total | | 2 | 2 | 2 | 2 | 3 | 1 | 3 | 15 |
| 00111039276 - Mesquite | 1st Cook (10 am to 1 pm) | 0 | 0 | 0 | 0 | 0 | 0 | 1 | 1 |
| | 2nd Cook (1 pm to 4 pm) | 1 | 1 | 1 | 1 | 0 | 0 | 0 | 1 |
| | 3rd Cook (4 pm to 7 pm) | 0 | 0 | 0 | 1 | 0 | 0 | 1 | 5 |
| | After 7 pm | 0 | 0 | 0 | 0 | 0 | 0 | 0 | 0 |
| 00111039276 - Mesquite Total | | 1 | 1 | 1 | 1 | 0 | 1 | 2 | 7 |

Fig. 8

RETAIL PRODUCTION GUIDE FOR STORE-PREPARED FOOD ITEMS

FIELD OF INVENTION

The present application relates to production guides, and in particular to a retail production guide for store-prepared food items.

BACKGROUND

Retail stores, such as a supermarket, often order items in bulk that are to be prepared in-store prior to display and customer selection. A cut-down case, for example, contains a single component that may be divided into a number of variably sized items of various item types. A side of beef or a primal (which is a portion of a side of beef) is a type of item that may be part of a cut-down case, as an example. A butcher at the store may cut the primal or side of beef to produce a number of different types of cuts of meat (e.g. tenderloin, roast, sirloin, hamburger and the like). The items produced from the side of beef will vary in size depending upon the size of the side of beef and the choices and cuts made by the butcher.

Typically, the butcher will place the items produced from the side of beef on display for consumer selection. Determining the number of items for the various item types to place on display is based on the experience of the butcher or other employee such as a manager. For large retail enterprises, reliance on individual experience can produce mixed results.

SUMMARY

In an aspect, a computer-assisted method of determining and producing quantities of perishable, store-prepared food items that should be displayed for consumer selection and purchase on a daily basis is provided. The method includes collecting daily sales data for the perishable, store-prepared food items and saving the daily sales data in memory. For a current specific day of the week, the daily sales data is processed for prior occurrences of the specific day to determine, for each of the perishable, store-prepared food items, a quantity to be placed on display. A total preparation quantity is reported for each of the perishable, store-prepared food items.

In another aspect, a computer implemented system capable of determining quantities of perishable, store-prepared food items that should be displayed for consumer selection and purchase on a daily basis includes a database sever for collecting and saving daily sales data for the perishable, store-prepared food items. An application server is included that, for a current specific day of the week, processes the daily sales data for prior occurrences of the specific day to determine, for each of the perishable, store-prepared food items, a quantity to be placed on display. A workstation is used to report a total preparation quantity for each of the perishable, store-prepared food items.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 2 is an embodiment of a control for allowing setting of a default number capable of use in the process of FIG. 1;

FIG. 3 is an embodiment of a control for allowing setting of an override number capable of use in the process of FIG. 1;

FIG. 4 is an embodiment of a data table capable of use in the process of FIG. 1;

FIG. 5 is an embodiment of a report that includes target production numbers;

FIG. 6 is an embodiment of an evaluation tool for comparing forecast data versus actual sales data;

FIG. 8 is another embodiment of a report that includes target production numbers;

DETAILED DESCRIPTION

For the purposes of describing one or more embodiments, this description will discuss a large retail grocery enterprise. This embodiment is merely exemplary in nature and is in no way intended to limit the invention, its application, or uses and alternatively this invention can be used in most any retail, wholesale or service enterprise where food items are prepared in-store and placed on display for consumer selection.

The system and method developed herein determines quantities of perishable, store-prepared food items that should be displayed for consumer selection and purchase on a daily basis at stores within a retail enterprise. An enterprise is a number of stores that may be grouped by geographical or corporate characteristics, such as divisions. Divisions may be defined by geographical location, type of store, e.g. a convenience store or a superstore, or demographics, e.g. rural, urban or suburban. In addition, the demographic profiles of store customers may be used to group stores (e.g. a suburban middle class neighborhood or a suburban upper income neighborhood). As used herein, a store can be a retail outlet, wholesale outlet or other physical location where transactions involving goods or services occur between the customer and the enterprise.

Stores may be subdivided into smaller sections or departments to more effectively control and track their revenues and expenses. Examples of departments within a typical grocery store can include the meat department, pharmacy department, grocery department, produce department, frozen foods department and the like. Departments may be sub-divided into commodities to facilitate better control over the activities in the department. For example, the meat department may be subdivided into commodities such as hotdogs, bacon and the like. Commodities may be further divided into subcommodities. For example, beef franks is a subcommodity within the hotdog commodity. Subcommodities are collections of items.

An item, as used herein, is a unit of sale of a good. Items may be delivered to the store from warehouses or directly from vendors in cases. A case, as used herein, is a collection of items packaged for delivery to a store. For example, a case may include a side of beef or a primal that is to be divided, in-store, into multiple perishable food items (e.g., brisket, rib, rib eye (or Delmonico steak), loin or sirloin (or strip steak), filet (Chateaubriand, filet mignon and tournedos), flank (London broil), roasts, skirt and plate (can include short ribs), steaks (T-bone, porterhouse, sirloin), hamburger, shoulder and chuck, rump and round, stew) for display and purchase.

The system and method rely on actual sales data for dynamically forecasting a quantity of each perishable, store-prepared food item that should be on display for a given day.

Figure 1:
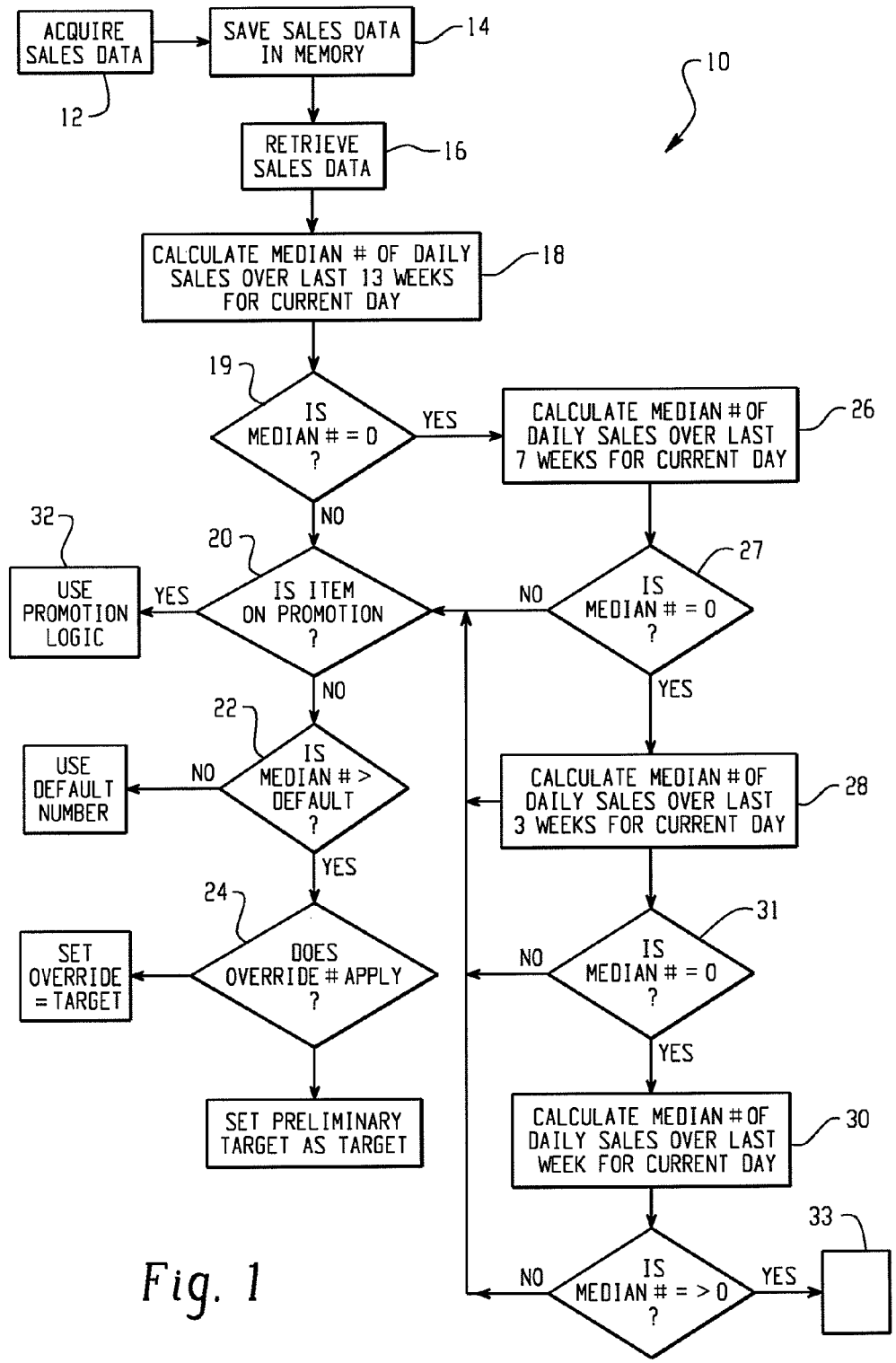
FIG. 1 is a flowchart illustrating an embodiment of a process of determining a target production number.

Referring to FIG. 1, a process 10 for determining quantities of perishable food items to be prepared in-store includes acquiring sales data for a store-prepared item at, for example, a point-of-sale, terminal, over the Internet, etc. at step 12. At step 14, the sales data is saved in memory and, in some embodiments, this sales data may be periodically collected and transmitted to an enterprise data center for processing.

The system may include a database for saving the sales data and also detailed information regarding virtually every type of item including store-prepared food items which may be sold by any store in the enterprise. As used herein, a database is a collection of related data. In one embodiment, the database may be maintained at an enterprise data center. At step 16, the system may retrieve the sales data from the database for each type of perishable food item to be prepared in store.

The system retrieves and processes only selected sales data for each item at step 16. In the illustrated embodiment, the system processes only data for a current specific day of the week (e.g., Monday) over a pre-selected number of weeks, in this instance, 13 weeks (e.g., 13 previous Mondays immediately prior to the current Monday). In some embodiments, the selection of the 13 previous weeks excludes any week or weeks that the item was on a promotion. At step 18, a median number of daily sales for the item is calculated using the retrieved sales data. In some embodiments, a preliminary target production number is set that includes the median number of daily sales calculated at step 18 times a lift factor (e.g., 1.5) that may be based on the shelf life for a particular food item. In certain embodiments, the preliminary target production number may be the calculated median number of daily sales for the current day plus a fraction (e.g., one-half) of a calculated median number of daily sales for the following day. In other embodiments, the preliminary target production number is the calculated median number of daily sales for the current day.

If, at step 19, the preliminary target production number is not zero, then the system determines whether the item is on promotion at step 20. If the item is not on promotion, then at step 22, the system determines whether the preliminary target production number is greater than a default number associated with the item, if the default number applies. The default number may be a user-selected minimum number of items to be prepared and placed on display. Setting a default number may be used to "force out" certain food items when the preliminary target production number is lower than the default number. If the preliminary target production number is greater than the default number at step 22, then the system determines whether an override value applies at step 24. The override value may be a user-selected number of items that overrides the preliminary target production number regardless of the value of the preliminary target production number. If an override value does not apply at step 24, then the system sets the preliminary target production number as the target production number.

If, at step 19, the preliminary target production number is zero, then the system processes only data for the current specific day of the week over a reduced number of weeks, in this instance, seven weeks at step 26. If the preliminary target production number for the seven weeks is not zero, steps 20, 22 and 24 are performed as described above, when applicable. If, at step 27, the preliminary target production number is again zero, then the system processes only data for the current specific day of the week over a reduced number of weeks, in this instance, three weeks at step 28. If the preliminary target production number of daily sales for the three weeks is not zero, steps 20, 22 and 24 are performed as described above, when applicable. If, at step 31, the preliminary target production number is again zero, then the system processes only data for the current specific day of the week over a reduced number of weeks, in this instance, one week (e.g., the last week) at step 30. If the preliminary target production number for the one week is not zero, steps 20, 22 and 24 are performed as described above, when applicable. If the preliminary target production number is again zero, then none of that item may be prepared or one or more items may be prepared and placed on display, for example, based on a user selected amount at step 33. This reduction of the amount of weeks over which data is processed each time the preliminary target production number is zero, e.g., from 13 weeks down to one week can account for new items (e.g., such as kabobs in the summer months) recently added in the department or realizing increased sales.

If, at step 20, the system determines that the food item is on promotion, then the system employs promotion logic at step 32 to determine a promotion target production number. In some embodiments, the system may use sales data collected on previous promotion days when the item was on the same or similar promotion. These promotion days may be omitted or dropped from calculation of the median number of daily sales in step 18 so as to avoid inflation of the preliminary target production number, as noted above. The promotion target production number may or may not be set as the target production number. In some embodiments, even if two or more of a preliminary target production number, promotion target production number, default and/or override number applies, the system may set the highest of these numbers as the target production number. For example, if the item is on promotion, the system may compare and select the higher of the preliminary target production number and the promotion target production number and so on.

Various methods may be used to set default, override and/or promotion numbers. For example, referring to FIG. 2 defaults may be set, for example, based on item UPC. A default minimum for the illustrated UPC (corresponding to beef loin T-bone steak) is set in the default presentation minimum field 34 as 3 items. Referring now to FIG. 3, override numbers may be set for the same UPC at a store override report 35 based on the store. For example, referring to Zone: B, store 202 does not have an override number associated therewith, but does have a default presentation minimum of 3 items. Store 512 does have an override number of 6 items associated therewith. Thus, the system will indicate to store 512 that 6 beef loin T-bone steaks should be produced and/or be on display at any (or a certain) given time.

Promotion numbers may be determined using by identifying a "like week." The like week for a promotional item is a previous promotion week that is selected as being a good forecast for a current week during which the item is on promotion. In some embodiments, the like week may be selected by a merchandiser for the relevant item. In certain embodiments, a promotional number may be determined based on three weighted data points: (a) the number of relevant items sold during a merchandiser chosen like week for a previous one of the particular day; (b) an adjustment made based on the week and month during which the promotion is taking place; and (c) an adjustment made based on the price point of the relevant item.

Figure 4B:
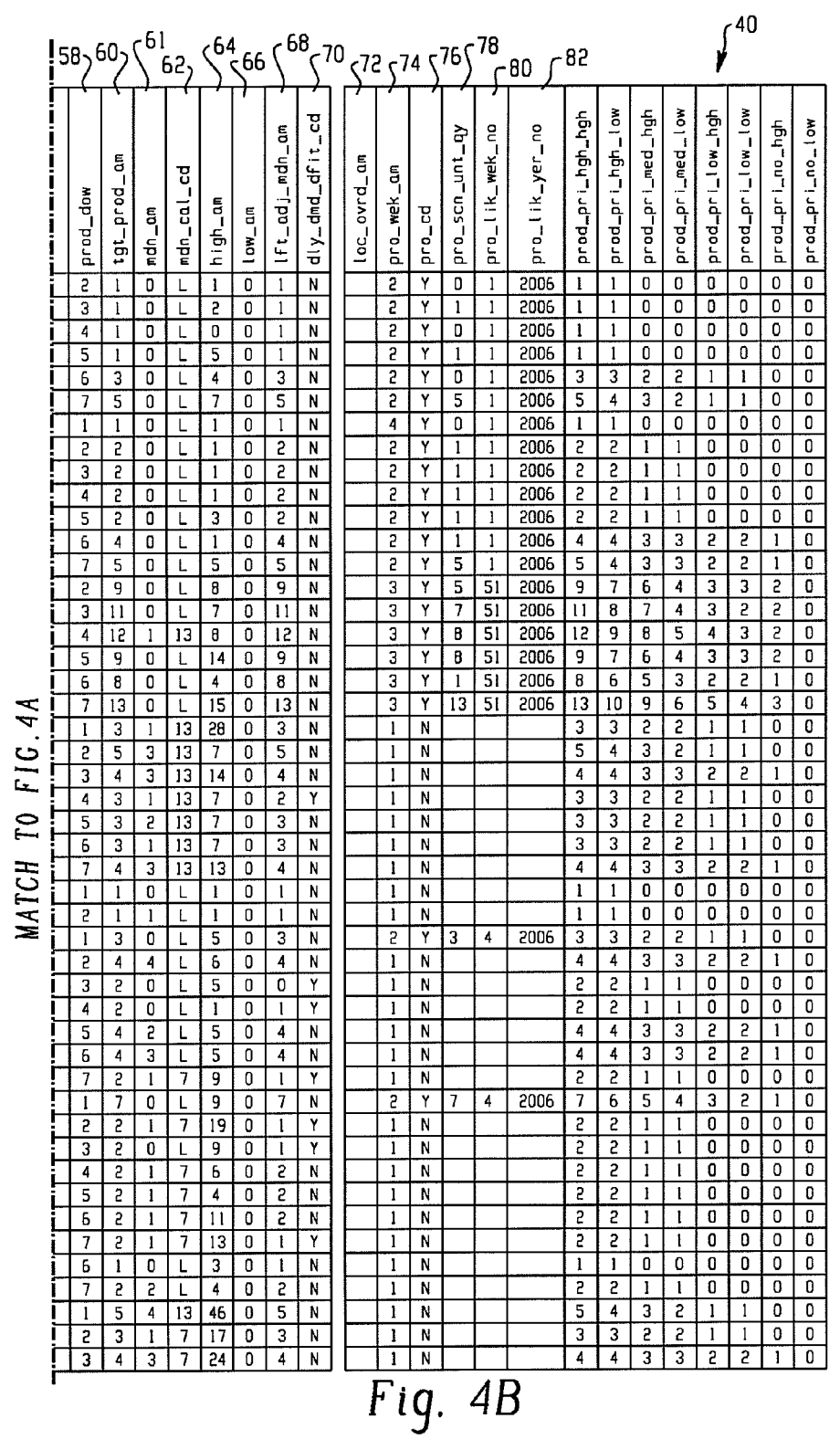

FIG. 4 illustrates an exemplary database table 40 used to determine the target production number for a particular store. Referring to the columns of the table 40 from left to right, column 42 includes consumer UPCs associated with respective food items, column 44 includes descriptions of the food items that match an item description on the products, column 46 includes family group identifiers that include a series of consumer UPCs associated therewith and column 48 includes price look-up codes associated with the items and used to determine item prices. Column 50 includes variety checklist codes that are linked to a family group, column 52 indicates whether a primary product is mandated and column 54 includes the daily default amount for the items. Column 56 includes lift factor codes (e.g., D for daily which includes the current day calculated median number plus a fraction of the next day calculated median number or P for percent which is simply a percentage of the calculated median number for the current day), column 58 includes numbers representing the day of the week and column 60 includes the target production amounts. Column 61 includes the calculated median numbers for each day, column 62 includes markdown calculation codes, column 64 includes the highest amounts of each item sold within a time period for previous ones of a particular day and column 66 includes the lowest amounts of each item sold within the time period for previous ones of the particular day. Column 68 includes the preliminary target production number calculated using the median number and lift factor and column 70 indicates whether the daily default amount applies. Columns 72, 74, 76, 78, 80 and 82 pertain to promotion information with column 76 indicating whether a promotion applies and column 78 includes a number of items to be produced due to the promotion.

To illustrate how an exemplary target amount may be calculated using table 40, row 83 pertains to rib eye steak with a particular UPC. As can be seen at row 83, column 61, the median sales over previous ones (e.g., 13, 7, 3 or one depending on whether the calculated median value is zero as described above) of the current day is one item. Because the daily lift factor code D applies in column 56, one-half of the next day's calculated median number (row 84, column 61) is added to the current day's calculated median number of one giving a preliminary target production number of three, which is equal to the default number in column 54. Therefore, the target production number in row 83, column 60 is three rib eye steaks.

Referring to FIG. 5, an embodiment of a report 86 is shown that is accessible by a user (e.g., by print-out and/or display, for example, on a computer screen). Report 86 is simplified for ease of use compared to the data table 40 (FIG. 4) and includes a description 88 of the item, a scannable barcode 89, UPC 90 for the item and daily target production number 92 for the item. The daily target production number 92 indicates the number of items that should be on display for customer selection throughout the day.

As can be seen, there are multiple target numbers (e.g., three) for each item. The target numbers each corresponds to a walk time at which an employee should walk through the department for a visual inspection (e.g., at 9 am, 12 pm and 3 pm) to determine the actual number of items on the shelf. If the actual number of items is less than the target production number 92, then one or more additional items are produced and placed on display to reach the target production number.

In some embodiments, logic may be added which processes daily current week sales trend by item to provide a daily exception report that indicates, in real time, a change in the target production number and notifies the user, e.g., via the Internet, intranet, etc. as to items having high and/or low variances from the target production number. As an example, the system may provide a daily exception report notifying the user as to any items having variances greater than three times the daily target production number as a high indicator and any items having variances less than one-third the daily target production number as a low indicator.

In some embodiments, real-time sales data (e.g., collected at a point-of-sale including a kiosk, over the telephone, over the Internet, etc.) can be utilized by the system (e.g., using the Internet, intranet, through hand-held and/or other electronic devices) to change daily target production numbers based on increased and/or decreased sales versus forecasted daily target production numbers at selected time intervals and to provide an exception based report notifying the user of such changes. The exception based report may provide only adjusted target production numbers based on a predetermined percent tolerance of actual sales versus the originally determined target production number. The percent tolerance may be a sliding scale versus time of day for item movement. As an example, daily target production numbers may be analyzed twice daily (e.g., 11 pm and 3 pm) to determine if the daily target production numbers will satisfy item movement based on a prorated sales anticipation (e.g., 14 percent of item sales through 11 pm, 36 percent of sales between 11 pm and 3 pm). Comparing the target production numbers versus real-time sales may then readjust production quantities for the later part of the day which may capitalize total sales within a later time frame.

Figure 7:
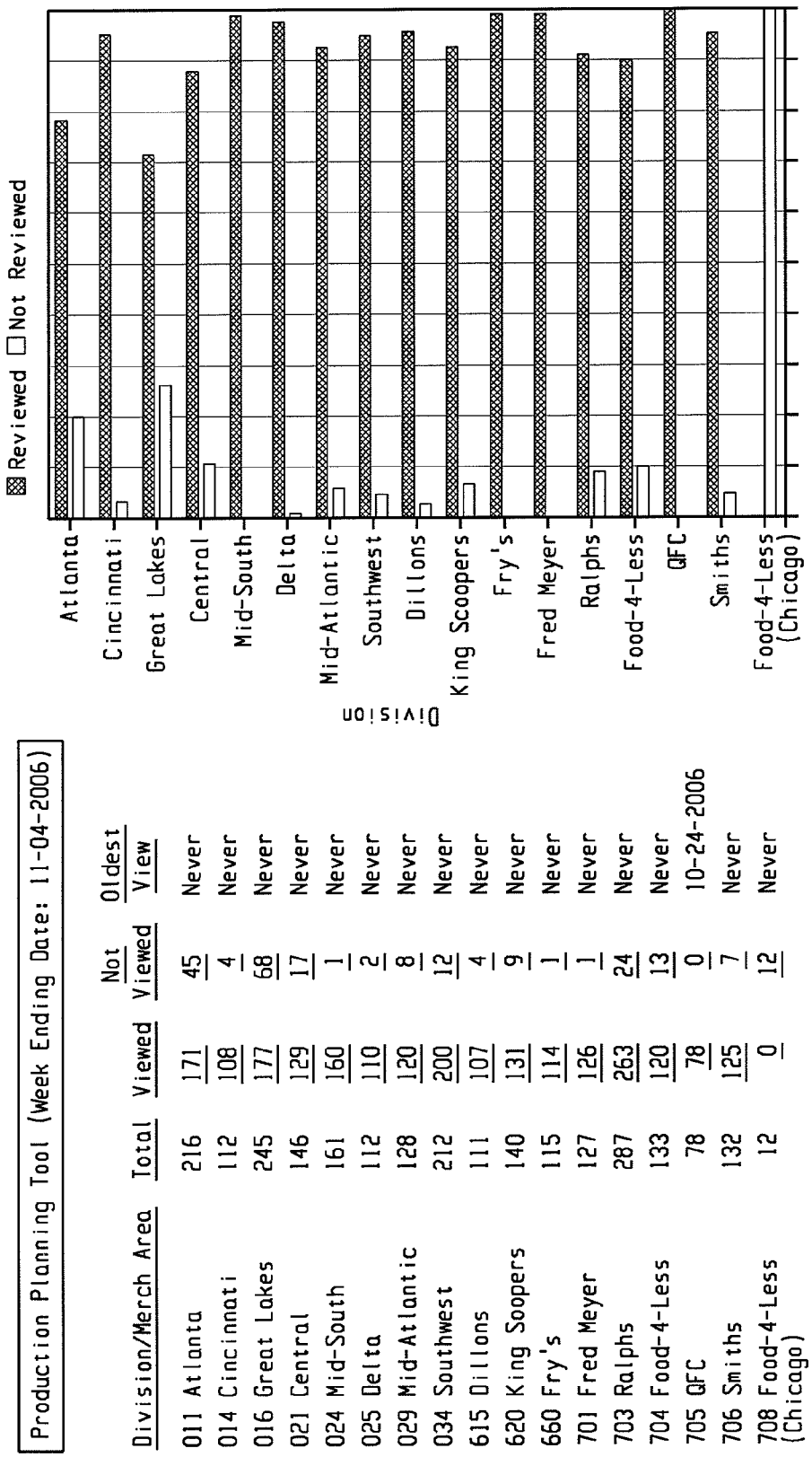
FIG. 7 is an embodiment of an evaluation tool for determining system usage.

The system may include compliance tools to evaluate compliance based on, for example, division or even enterprise wide and/or to evaluate forecast performance per store, division and/or enterprise wide based on actual sales data. FIG. 6, for example, shows a comparison report 93 between items sold at base price ("Base") and markdown price ("MD") versus the target production number ("Proj Qty") for a particular division. In some embodiments, referring to FIG. 7, the system may track how many stores are viewing and/or printing the production reports to provide an indication of store compliance.

Hourly forecasting may also be realized. Referring to FIG. 8, a screenshot of a computer report 94 includes a description 95 of an item, in this illustration, rotisserie chicken to prepare and place on display for sale throughout a particular day to minimize shrink while maximizing sales. The report 94 further includes a scannable UPC 96 for the rotisserie chicken and four cook periods 1-4, which correspond to cooking times (e.g., 10 am, 1 pm, 4 pm and 7 pm). As shown, for Regular rotisserie chicken at 1 pm, preparation of one Regular rotisserie chicken should begin. Once cooked, the Regular rotisserie chicken is placed on display for sale.

The target number of rotisserie chickens to be prepared is determined in a fashion similar to that described above. Instead of calculating the target production number on a daily basis only, however, the target production number is calculated on both a daily and cook period basis.

Figure 9:
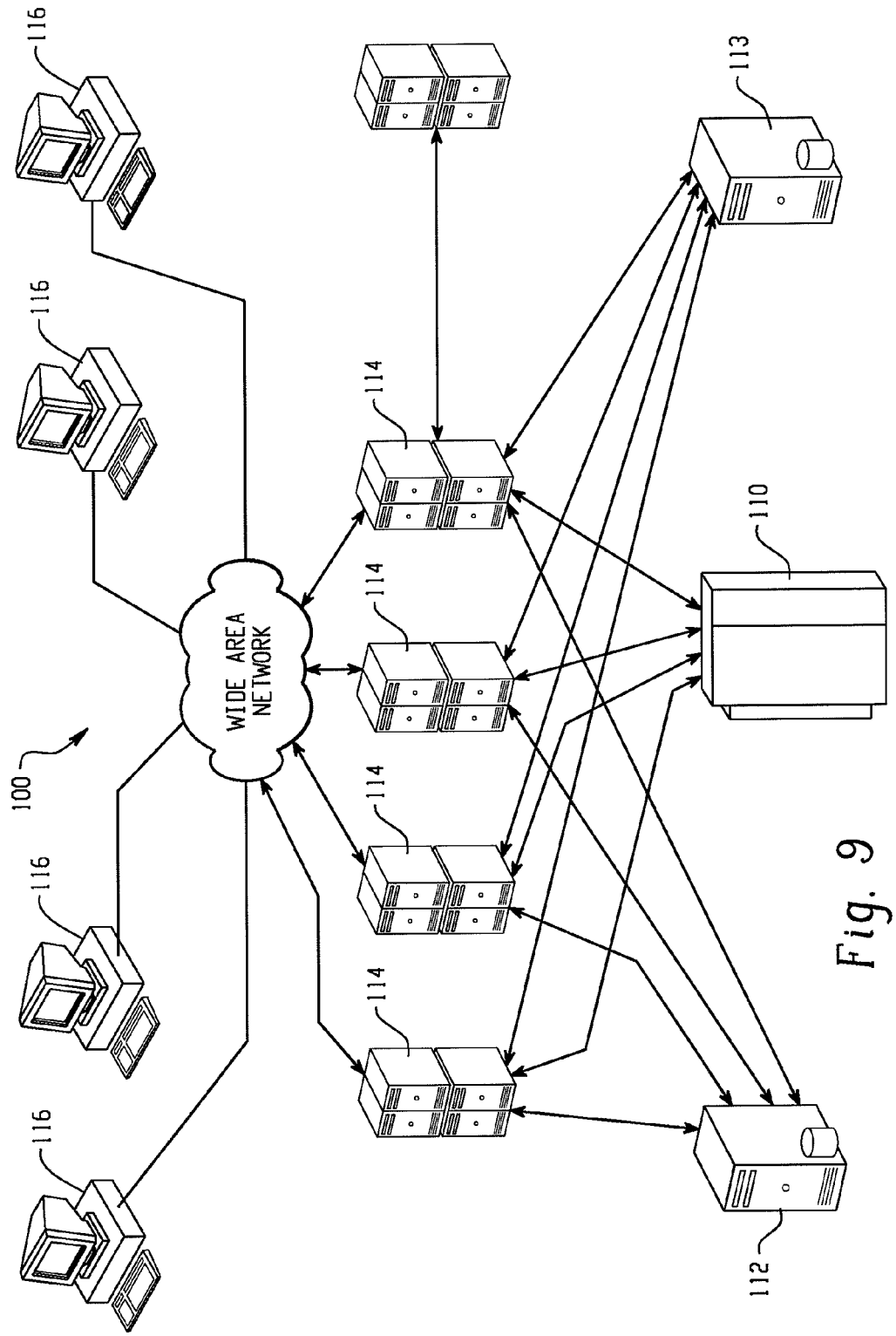
FIG. 9 is an illustration of an embodiment of a system architecture.

FIG. 9 illustrates one embodiment of a system architecture 100 for the retail production guide system. The lines depicted in FIG. 9 connecting the elements of the system 100 indicate communication paths rather than physical connections between the elements. The system 100 may include a corporate data warehouse 110. The item information database may be maintained on the corporate data warehouse 110. The item information database may be implemented as a relational database, such as DB2 Universal Database V8.1 commercially available from IBM.

A corporate sales planning server 112 and corporate scale management server 113 may be used to provide pricing and item information to the store level. The servers 112 and 113 may also maintain the sales information received from POS systems located at the stores. The corporate sales planning server 112 and corporate scale management server 113 may be implemented using the eServer zSeries 900, commercially available from IBM.

The system 100 may include one or more division servers 114. Each division of the enterprise may have a separate division server 114 in communication with one or more store workstations 116. The division server 114 may be implemented using an eServer series 570, available from IBM. In some embodiments, store servers are connected to one or more store workstations 116 for the store.

The store workstation 116 may be implemented using a personal computer having suitable input/output devices, such as a mouse or keyboard, processors, memory and communications interfaces. For example, the workstation 116 could be implemented using the ThinkCentre™ A30, commercially available from IBM. Workstation 116, as used herein, may also include digital assistants and other devices permitting connection to and navigation of the network.

The system 100 may include one or more enterprise workstations (not shown). System administrators may utilize the enterprise workstation to maintain and update the corporate data warehouse 110, corporate sales planning server 112, corporate scale management server 113 and/or division servers 114. As shown, the various systems may be connected to a wide area network (WAN), such as an intranet, the Internet, an extranet or any other communications network. The system is sufficiently flexible in its design to permit implementation in various computer systems and networks and is not limited to the system architecture described above.

Figure 10:
FIG. 10 is another embodiment of a report for use in case management.

While particular embodiments of the present invention have been illustrated and described, it would be obvious to those skilled in the art that various additional changes and modifications can be made without departing from the spirit and scope of the present invention. Referring to FIG. 10, the system may also be used for orderable items. For example, some items may be produced in some stores and ordered in other stores. Forecasts may be used to determine the number of cases to be ordered for a particular day. While the items, commodities, departments and the like have been shown illustrative of a grocery store, certainly those of skill in the art can apply these principles to stores, factories, service industries and warehouses of various types. It is therefore intended to cover in the appended claims all such changes and modifications that are within the scope of this invention.

What is claimed:

1. A computer-assisted method of determining, producing and presenting for sale quantities of perishable, store-prepared food items that should be displayed for consumer selection and purchase on a daily basis, the method comprising:
   (a) collecting daily sales data for the perishable, store-prepared food items;
   (b) saving the daily sales data in memory of a computer system; and
   (c) for a current specific day of the week,
      (i) processing, by the computer system, the stored daily sales data for the specific day to determine, for each of the perishable, store-prepared food items, a quantity to be placed on display; and
      (ii) reporting a target preparation quantity for each of the perishable, store-prepared food items;
   (d) generating, by the computer system, a first preparation guide for the current specific day, the first preparation guide identifying each perishable, store-prepared food item and its associated target preparation quantity;
   (e) comparing, on the current specific day, an actual number of each perishable, store-prepared food item on display for sale in the store with the target preparation quantity and, if the actual number is lower than the target preparation quantity for a given perishable, store-prepared food item, producing and placing on display for sale in the store the given perishable, store-prepared food item in a quantity sufficient so that the target preparation quantity is on display for sale in the store; wherein the step of processing the daily sales data includes the computer system utilizing a median number of daily sales identification routine that:
      (i) identifies a first median number of daily sales for the specific day over a first specified number of prior weeks immediately prior to the specific day,
      (ii) if the first median number of daily sales is zero, identifies a second median number of daily sales for the specific day over a second specified number of prior weeks immediately prior to the specific day, the second specified number less than the first specified number, and
      (iii) if the second median number of daily sales is zero, identifies a third median number of daily sales for the specific day over a third specified number of prior weeks immediately prior to the specific day, the third specified number less than the second specified number.

2. The computer-assisted method of claim 1, wherein the target preparation quantity is the quantity determined in step (c)(i).

3. The computer-assisted method of claim 1 further comprising printing the first preparation guide and utilizing the first printed preparation guide for the purpose of step (e).

4. The computer-assisted method of claim 3 further comprising
   (f) for a next current specific day of the week,
      (i) processing, by the computer system, the stored daily sales data for the next specific day to determine, for each of the perishable, store-prepared food items, a quantity to be placed on display; and
      (ii) reporting a target preparation quantity for each of the perishable, store-prepared food items;
   (g) generating a second preparation guide for the next specific day, the second preparation guide identifying each perishable, store-prepared food item and its associated target preparation quantity;
   (h) comparing, on the next specific day, an actual number of each perishable, store-prepared food item on display for sale in the store with the target preparation quantity defined by the second preparation guide and, if the actual number is lower than the target preparation quantity defined by the second preparation guide for a specific perishable, store-prepared food item, producing and placing on display for sale in the store the specific perishable, store-prepared food item in a quantity sufficient so that the target preparation quantity defined by the second preparation guide is on display for sale in the store.

5. The computer-assisted method of claim 4 further comprising printing the second preparation guide and utilizing the second printed preparation guide for the purpose of step (h).

6. The computer-assisted method of claim 1 further comprising receiving a cut-down case including a component to be divided into multiple items where the items are suitable for retail sale.

7. The computer-assisted method of claim 6 further comprising dividing the component based on the target preparation quantity.

8. The computer-assisted method of claim 7, wherein the component is a primal.

9. The computer-assisted method of claim 1 further comprising, for at least one of the perishable, store-prepared food items, overriding the quantity determined in step (c)(i) with a pre-selected quantity and setting the pre-selected quantity as the target preparation quantity.

10. The computer-assisted method of claim 9 further comprising manually entering the pre-selected quantity and saving the manually entered pre-selected quantity in the memory.

11. The computer-assisted method of claim 1 further comprising adjusting the quantity determined in step (c)(i) by a predetermined factor and setting the adjusted quantity as the target preparation quantity.

12. The computer-assisted method of claim 1 further comprising, when determining median number of daily sales for a particular food item, excluding daily sales data for any day on which the particular food item was on promotion.

13. The computer-assisted method of claim 1 further comprising the computer system adjusting, during the current specific day, the target preparation quantity based on actual sales data collected during the current specific day.

14. The computer-assisted method of claim 1 wherein the first specified number of prior weeks is thirteen, the second specified number of prior weeks is seven and the third specified number of prior weeks is three.

15. The computer-assisted method of claim 14 wherein if the third median number of daily sales is zero, the median number of daily sales identification routine identifies a fourth median number of daily sales for the specific day for a last week immediately prior to the specific day.

16. A computer implemented system capable of determining quantities of perishable, store-prepared food items that should be displayed for consumer selection and purchase on a daily basis, the system comprising:
   a database for storing historical daily sales data for the perishable, store-prepared food items;
   an application server that, for a current specific day of the week, processes the stored historical daily sales data for the specific day to determine, for each of the perishable, store-prepared food items, a quantity to be placed on display for sale on the current specific day wherein the determination is made at least in part upon use of a median number of daily sales identification routine that:
   (i) identifies a first median number of daily sales for the specific day over a first specified number of prior weeks immediately prior to the specific day,
   (ii) if the first median number of daily sales is zero, identifies a second median number of daily sales for the specific day over a second specified number of prior weeks immediately prior to the specific day, the second specified number less than the first specified number, and
   (iii) if the second median number of daily sales is zero, identifies a third median number of daily sales for the specific day over a third specified number of prior weeks immediately prior to the specific day, the third specified number less than the second specified number;
   and a workstation that is used to report a target preparation quantity for each of the perishable, store-prepared food items, wherein, on the current specific day of the week:
   the workstation initially displays a first preparation guide for the current specific day, the preparation guide identifying each perishable, store-prepared food item and its associated target preparation quantity, wherein at least some of the target preparation quantities are the quantities determined by processing the stored historical daily sales data;
   the application server reevaluates the target preparation quantities by comparing actual sales that have occurred during a portion of the current specific day and adjusts target production quantity for at least one perishable, store prepared food item based upon the comparison.

17. The system of claim 16, wherein the application server adjusts the quantity determined by processing the daily sales data by a predetermined factor and sets the adjusted quantity as the target preparation quantity.

18. A computer-assisted method of determining quantities of perishable, store-prepared food items that should be prepared and displayed for consumer selection and purchase on a daily basis, the method comprising:
   (a) collecting daily sales data for the perishable, store-prepared food items at a point-of-sale;
   (b) saving the daily sales data in memory of a computer system;
   (c) for a specific day of a given week, the computer system:
      (i) processing the stored daily sales data for the specific day to determine, for each of the perishable, store-prepared food items, a quantity to be placed on display, wherein the determination is made at least in part upon use of a median number of daily sales identification routine that identifies a non-zero median number of daily sales for the specific day over a specified number of prior weeks immediately prior to the specific day;
      (ii) generating a first preparation guide for the specific day, the first preparation guide identifying each perishable, store-prepared food item and its associated quantity determined in (c)(i);
      (iii) printing the first preparation guide and utilizing the printed first preparation guide on the specific day of the given week to determine whether to prepare additional quantities of the perishable, store-prepared food items by comparing an actual number of each perishable, store-prepared food item on display for sale in the store with the corresponding quantity determined in (c)(i);
   (d) for a next day of the given week,
      (i) processing the stored daily sales data for the next day to determine, for each of the perishable, store-prepared food items, a quantity to be placed on display, wherein the determination is made at least in part upon use of a median number of daily sales identification routine that identifies a non-zero median number of daily sales for the next day over a specified number of prior weeks immediately prior to the specific day;
      (ii) generating a second preparation guide for the specific day, the second preparation guide identifying each perishable, store-prepared food item and its associated quantity determined in (d)(i);
      (iii) printing the second preparation guide and utilizing the printed second preparation guide on the next day of the given week to determine whether to prepare additional quantities of the perishable, store-prepared food items by comparing an actual number of each perishable, store-prepared food item on display for sale in the store with the corresponding quantity determined in (d)(i).

19. The method of claim 18, further comprising:

in step (c) and subsequent to (c)(iii):
- the computer system adjusting, on the specific day of the given week, the quantity for a specific perishable, store-prepared food item based on actual sales data collected on the specific day of the given week;
- printing an updated first preparation guide on the specific day of the given week;
- using the updated first preparation guide to determine whether to prepare additional quantities of the specific perishable, store prepared food item, in step (d) and subsequent to (d)(iii):
- the computer system adjusting, on the next day of the given week, the quantity for a particular perishable, store-prepared food item based on actual sales data collected on the next day of the given week;
- printing an updated second preparation guide on the next day of the given week;
- using the updated second preparation guide to determine whether to prepare additional quantities of the specific perishable, store prepared food item.

20. The method of claim 18 wherein:
- in step (c)(i) the stored daily sales data is processed for the specific day to determine, for each of the perishable, store-prepared food items, quantity to be placed on display at each of at least two different times of day;
- in step (c)(ii) the first preparation guide identifies each perishable, store-prepared food item and its associated quantity determined in (c)(i) for each time of day;
- in step (d)(i) the stored daily sales data is processed for the specific day to determine, for each of the perishable, store-prepared food items, quantity to be placed on display at each of at least two different times of day;
- in step (d)(ii) the second preparation guide identifies each perishable, store-prepared food item and its associated quantity determined in (d)(i) for each time of day.

\* \* \* \* \*